United States Patent
Xu et al.

(10) Patent No.: US 10,862,167 B2
(45) Date of Patent: Dec. 8, 2020

(54) HIGH-TEMPERATURE LITHIUM-ION BATTERY ELECTROLYTE AND PRODUCTION METHOD THEREOF, AND HIGH-TEMPERATURE LITHIUM-ION BATTERY

(71) Applicants: Huawei Technologies Co., Ltd., Shenzhen (CN); DONGGUAN AISIPU ENERGY TECHNOLOGY CO., LTD., Dongguan (CN)

(72) Inventors: Guocheng Xu, Shenzhen (CN); Fengchao Xie, Shenzhen (CN); Rui Xu, Dongguan (CN); Hui Li, Shenzhen (CN)

(73) Assignees: Huawei Technologies Co., Ltd., Shenzhen (CN); Dongguan Aisipu Energy Technology Co., Ltd, Dongguan (CN)

( * ) Notice: Subject to any disclaimer, the term of this patent is extended or adjusted under 35 U.S.C. 154(b) by 123 days.

(21) Appl. No.: 16/171,983

(22) Filed: Oct. 26, 2018

(65) Prior Publication Data
US 2019/0067742 A1 Feb. 28, 2019

Related U.S. Application Data

(63) Continuation of application No. PCT/CN2016/104038, filed on Oct. 31, 2016.

(30) Foreign Application Priority Data

Apr. 29, 2016 (CN) .......................... 2016 1 0284298

(51) Int. Cl.
| | |
|---|---|
| *H01M 10/0567* | (2010.01) |
| *H01M 10/0525* | (2010.01) |
| *H01M 10/0568* | (2010.01) |
| *H01M 10/0569* | (2010.01) |
| *H01M 10/42* | (2006.01) |

(52) U.S. Cl.
CPC ... *H01M 10/0567* (2013.01); *H01M 10/0525* (2013.01); *H01M 10/0568* (2013.01); *H01M 10/0569* (2013.01); *H01M 10/4235* (2013.01); *H01M 2300/0025* (2013.01)

(58) Field of Classification Search
CPC ...... H01M 4/04; H01M 4/131; H01M 4/1391; H01M 4/36; H01M 4/505; H01M 4/62; H01M 4/628; H01M 4/366; H01M 4/0421; H01M 10/0525; C23C 16/30; C23C 16/455; C23C 16/45531; C23C 16/45555
See application file for complete search history.

(56) References Cited

U.S. PATENT DOCUMENTS

| | | | |
|---|---|---|---|
| 6,544,685 B2 | 4/2003 | Kim et al. | |
| 2001/0018151 A1* | 8/2001 | Kim | H01M 10/0567 429/326 |
| 2006/0264654 A1* | 11/2006 | Wehner | C07F 9/3895 562/8 |
| 2008/0206649 A1* | 8/2008 | Kawashima | H01M 10/0525 429/324 |

FOREIGN PATENT DOCUMENTS

| | | |
|---|---|---|
| CN | 101090162 A | 12/2007 |
| CN | 102403534 A | 4/2012 |
| CN | 103779607 A | 5/2014 |
| CN | 104638293 A | 5/2015 |
| CN | 104934636 A | 9/2015 |
| CN | 105047992 A | 11/2015 |
| CN | 105047994 A | 11/2015 |
| CN | 105070947 | * 11/2015 |
| CN | 105070947 A | 11/2015 |
| CN | 105226321 A | 1/2016 |
| JP | 2008130528 A | 6/2008 |

OTHER PUBLICATIONS

CN105070947 MT (Year: 2015).*

(Continued)

*Primary Examiner* — Alexander Usyatinsky
(74) *Attorney, Agent, or Firm* — Leydig, Voit & Mayer, Ltd.

(57) ABSTRACT

The present application provides a high-temperature lithium-ion battery electrolyte, including a lithium salt, an organic solvent, and a water removal additive. A structural formula of the water removal additive is shown as a formula (1):

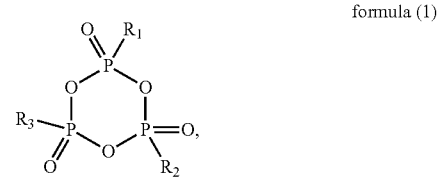

formula (1)

where $R_1$ is a —NCH—$(CH_2)_n$—CN group, and $0<n\leq 20$; $R_2$ is a —$R_{11}$—CO—$NR_{12}R_{13}$ group, $R_{11}$ is a —$(CH_2)_m$— group, $0\leq m<19$, each of $R_{12}$ and $R_{13}$ is one independently selected from H and —$(CH_2)_x$—$CH_3$ groups, $0\leq x\leq 19-m$, and both m and x are integers; and $R_3$ is any one selected from H, F, Cl, and Br. The high-temperature lithium-ion battery electrolyte can effectively eliminate trace water in a battery system, restrain HF generation, protect an electrochemical system in a battery, and significantly improve high-temperature storage performance and high-temperature cycling performance of a lithium-ion battery. The present invention further provides a production method for the electrolyte and a high-temperature lithium-ion battery that includes the electrolyte.

20 Claims, No Drawings

(56) References Cited

OTHER PUBLICATIONS

Yan et.al. J. Power Sources, 2014, 131 (Year: 2014).*
Yan, Guochun et al., "Effects of 1-propylphosphonic acid cyclic anhydride as an electrolyte additive on the high voltage cycling performance of graphite/ LiNi0.5CO0.2Mn0.3O2 battery", Electrochimica ACTA, 166:190-196 (2015).
Yan et al., "Beneficial effects of 1-propylphosphonic acid cyclic anhydride as an electrolyte additive on the electrochemical properties of LiNi0.5Mn1.5O4 cathode material," Journal of Power Sources, vol. 263, Elsevier B. V., pp. 231-238 (Oct. 1, 2014).

\* cited by examiner

HIGH-TEMPERATURE LITHIUM-ION BATTERY ELECTROLYTE AND PRODUCTION METHOD THEREOF, AND HIGH-TEMPERATURE LITHIUM-ION BATTERY

CROSS-REFERENCE TO RELATED APPLICATIONS

This application is a continuation of International Application No. PCT/CN2016/104038, filed on Oct. 31, 2016, which claims priority to Chinese Patent Application No. 201610284298.2, filed on Apr. 29, 2016. The disclosures of the aforementioned applications are hereby incorporated by reference in their entireties.

TECHNICAL FIELD

The present application relates to the field of lithium-ion battery technologies, and in particular, to a high-temperature lithium-ion battery electrolyte and a production method thereof, and a high-temperature lithium-ion battery.

BACKGROUND

Compared with a conventional lead-acid or NiMH rechargeable battery, a lithium-ion rechargeable battery is widely applied in various fields because of advantages such as a high energy density, a high voltage, a low self-discharge rate, and a light weight. However, high-tech fields such as a notebook computer, a mobile phone, a mobile tool, an electric vehicle, backup power for a base station, and drilling have an increasingly high requirement for battery performance, and a use environment of a battery becomes harsher. Especially in a harsh high-temperature environment, for example, backup power for an outdoor base station, or drilling bit monitoring, an existing commercial lithium-ion rechargeable battery cannot meet a use requirement.

Due to a special chemical system and unique design of the lithium-ion rechargeable battery, when an operating temperature is higher than 60° C., battery performance severely deteriorates, for example, battery capacity decays, internal resistance increases, a power characteristic deteriorates, or a cycle life shortens. This is because, under a high temperature condition, an electrolyte of the lithium-ion rechargeable battery auto-catalyzes and generates $H_2O$. $H_2O$ is rapidly converted into HF in the electrolyte, resulting in the following active side reactions: (1) A positive electrode active substance undergoes a side reaction with HF in the electrolyte, resulting in that a transition metal ion in the positive electrode active substance dissolves in the electrolyte, and that some of the positive electrode active substance loses activity; and (2) the metal ion dissolved in the electrolyte migrates to a negative electrode and is deposited on a surface of the negative electrode, resulting in that an SEI film of the negative electrode is clogged, and that the metal ion on the surface of the negative electrode further catalytically decomposes the electrolyte and therefore increases electrochemical reaction polarization. In addition, because the SEI film of the negative electrode is quite unstable at a high temperature, a decomposition reaction is likely to occur, and the SEI film may fail to passivate the negative electrode. All these side reactions exacerbate the deterioration of the performance of the lithium-ion battery.

Currently, a main existing method for improving high-temperature performance of the lithium-ion battery is: adding a negative electrode film-forming additive to the electrolyte to effectively form a film on the surface of the negative electrode. The SEI film may improve the high-temperature performance of the lithium-ion battery to a certain extent, but an improvement effect is insignificant. The existing method does not consider stability of an interface between a positive electrode and an electrolyte, or a case in which the electrolyte itself auto-catalyzes and generates $H_2O$ at a high temperature, $H_2O$ is rapidly converted into HF in the electrolyte, and HF further rapidly destroys the interface between the positive electrode and the electrolyte. As a result, a series of chain side reactions, such as dissolution of a transition metal ion of the positive electrode, occurs, and the performance of the lithium-ion battery rapidly deteriorates.

SUMMARY

In view of this, a first aspect of the present application provides a high-temperature lithium-ion battery electrolyte. The high-temperature lithium-ion battery electrolyte can effectively eliminate residual trace water introduced in a battery production process and trace water generated in a subsequent high-temperature process, restrain HF generation, and protect an electrochemical system in a lithium-ion battery, so as to resolve a problem that high-temperature performance of an existing lithium-ion battery is poor.

According to the first aspect, the present application provides the high-temperature lithium-ion battery electrolyte, including a lithium salt, an organic solvent, and a water removal additive, where the water removal additive is a phosphoric acid cyclic anhydride compound with a structural formula shown as a formula (1):

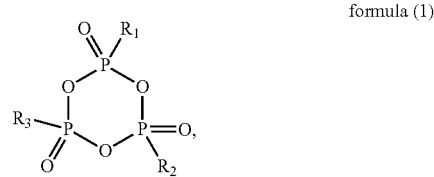

formula (1)

where
$R_1$ is a —NCH—$(CH_2)_n$—CN group, $0<n\leq 20$, and n is an integer;
$R_2$ is a —$R_{11}$—CO—$NR_{12}R_{13}$ group, $R_{11}$ is a —$(CH_2)_m$— group, $0\leq m<19$, each of $R_{12}$ and $R_{13}$ is one independently selected from H and —$(CH_2)_x$—$CH_3$ groups, $0\leq x\leq 19-m$, and both m and x are integers; and
$R_3$ is any one selected from H, F, Cl, and Br.

In embodiments of the first aspect of the present application, a value range of n may be 1-10, 1-6, 2-5, or 4-7, and a value range of m may be 1-12, 1-8, 2-6, or 3-5.

In some embodiments of the first aspect of the present application, $R_1$ is a —NCH—$(CH_2)_2$—CN group, $R_2$ is a —$CH_2$—CO—$NHCH_3$ group, and $R_3$ is F.

In some embodiments of the first aspect of the present application, $R_1$ is a —NCH—$(CH_2)_4$—CN group, $R_2$ is a —$CH_2$—CO—$NHCH_3$ group, and $R_3$ is F.

In some embodiments of the first aspect of the present application, $R_1$ is a —NCH—$(CH_2)_3$—CN group, $R_2$ is a —$(CH_2)_2$—CO—$NHCH_3$ group, and $R_3$ is Cl.

In some embodiments of the first aspect of the present application, $R_1$ is a —NCH—$(CH_2)_3$—CN group, $R_2$ is a —$(CH_2)_2$—CO—$NHCH_3$ group, and $R_3$ is F.

In some embodiments of the first aspect of the present application, $R_1$ is a —NCH—$(CH_2)_2$—CN group, $R_2$ is a —$(CH_2)_2$—CO—$NHCH_2CH_3$ group, and $R_3$ is Cl.

In some embodiments of the first aspect of the present application, $R_1$ is a —NCH—$(CH_2)_2$—CN group, $R_2$ is a —$CH_2$—CO—$NHCH_3$ group, and $R_3$ is H.

In the first aspect of the present application, the water removal additive can account for 0.5%-5% of a total weight of the high-temperature lithium-ion battery electrolyte.

In some embodiments of the first aspect of the present application, the electrolyte further includes a positive electrode film-forming additive and/or a negative electrode film-forming additive, the positive electrode film-forming additive is selected from at least one of adiponitrile (ADN, molecular formula: $C_6H_8N_2$), lithium difluoro oxalate borate (LiDFOB, molecular formula: $C_2BF_2LiO_4$), or ethylene carbonate (VEC), and the negative electrode film-forming additive is selected from at least one of lithium difluoro oxalate borate (LiDFOB, molecular formula: $C_2BF_2LiO_4$), vinylene carbonate (VC), ethylene carbonate (VEC), or 1,3-(1-propenyl) sultone (PS).

In the first aspect of the present application, the positive electrode film-forming additive can account for 1%-3% of the total weight of the high-temperature lithium-ion battery electrolyte, and the negative electrode film-forming additive can account for 0.5%-4% of the total weight of the high-temperature lithium-ion battery electrolyte.

In the first aspect of the present application, the organic solvent can be selected from at least one of propylene carbonate (PC), ethylene carbonate (EC), dimethyl carbonate (DMC), ethyl methyl carbonate (EMC), or diethyl carbonate (DEC).

In the first aspect of the present application, the lithium salt can be selected from at least one of lithium hexafluorophosphate (LiPF$_6$), lithium difluoro oxalate borate (LiDFOB), or lithium bisfluorosulfonyl imide (LiFSI).

According to the high-temperature lithium-ion battery electrolyte provided in the first aspect of the present application, the water removal additive of a specific structure is added to effectively eliminate residual trace water introduced in a battery production process and trace water generated in a subsequent high-temperature process. When the trace water is eliminated, most HF may be eliminated, thereby effectively avoiding a series of chain side reactions caused by HF, while protecting the electrochemical system in the lithium-ion battery, and significantly improving the high-temperature performance of the lithium-ion battery.

According to a second aspect, the present application provides a production method for a high-temperature lithium-ion battery electrolyte, including the following steps:

in a closed environment with moisture ≤10 ppm, refining and purifying an organic solvent, adding a lithium salt and a water removal additive to the organic solvent, and mixing the lithium salt and the water removal additive with the organic solvent uniformly, to obtain a high-temperature lithium-ion battery electrolyte, where the water removal additive is a phosphoric acid cyclic anhydride compound with a structural formula shown as a formula (1):

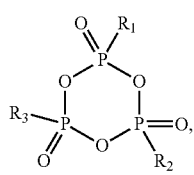

formula (1)

where $R_1$ is a —NCH—$(CH_2)_n$—CN group, 0<n≤20, and n is an integer;

$R_2$ is a —$R_{11}$—CO—$NR_{12}R_{13}$ group, $R_{11}$ is a —$(CH_2)_m$— group, 0≤m<19, each of $R_{12}$ and $R_{13}$ is one independently selected from H and —$(CH_2)_x$—$CH_3$ groups, 0≤x≤19-m, and both m and x are integers; and $R_3$ is any one selected from H, F, Cl, and Br.

In the second aspect of the present application, the water removal additive can account for 0.5%-5% of a total weight of the high-temperature lithium-ion battery electrolyte.

In some embodiments of the second aspect of the present application, the production method further includes adding a positive electrode film-forming additive and/or a negative electrode film-forming additive to the organic solvent, where the positive electrode film-forming additive is selected from at least one of adiponitrile, lithium difluoro oxalate borate, or ethylene carbonate, and the negative electrode film-forming additive is selected from at least one of lithium difluoro oxalate borate, vinylene carbonate, ethylene carbonate, or 1,3-(1-propenyl) sultone.

In the second aspect of the present application, the positive electrode film-forming additive can account for 1%-3% of the total weight of the high-temperature lithium-ion battery electrolyte, and the negative electrode film-forming additive can account for 0.5%-4% of the total weight of the high-temperature lithium-ion battery electrolyte.

The production method provided in the second aspect of the present application is simple and feasible, and is suitable for production expanding.

According to a third aspect, the present application provides a high-temperature lithium-ion battery, including a positive electrode, a negative electrode, a separator, and an electrolyte, where the high-temperature lithium-ion battery electrolyte according to the first aspect of the present application is used as the electrolyte.

The high-temperature lithium-ion battery provided in the third aspect of the present application has good high-temperature storage performance and high-temperature cycling performance.

Advantages of the present application are expounded in the following specification. Some of the advantages are obvious according to this specification, or may be learned according to implementation of embodiments of the present application.

DESCRIPTION OF EMBODIMENTS

The following descriptions are some implementations of the embodiments of the present application. It should be noted that a person of ordinary skill in the technical art may make certain improvements and polishing without departing from the principle of the embodiments of the present application and the improvements and polishing shall fall within the protection scope of the embodiments of the present application.

Generally, when an operating temperature of a lithium-ion battery is higher than 60° C., performance of the battery severely deteriorates, for example, battery capacity decays, internal resistance increases, a power characteristic deteriorates, or a cycle life shortens. This is because, under a high temperature condition, an electrolyte auto-catalyzes and generates $H_2O$. $H_2O$ is rapidly converted into HF in the electrolyte, resulting in active side reactions. A positive electrode active substance undergoes a side reaction with HF in the electrolyte, resulting in dissolution of a transition metal ion in the positive electrode active substance. At the same time, the metal ion dissolved in the electrolyte migrates to a negative electrode, resulting in that an SEI film of the negative electrode is clogged, and that the metal ion on a surface of the negative electrode further catalytically decomposes the electrolyte and increases electrochemical reaction polarization. In addition, because the SEI film is quite unstable at a high temperature, a decomposition reaction is likely to occur, and the SEI film may fail to passivate a positive electrode. The foregoing side reactions exacerbate deterioration of the lithium-ion battery performance.

To resolve the foregoing problem and effectively improve high-temperature performance of the lithium-ion battery, an embodiment of the present application provides a high-temperature lithium-ion battery electrolyte. The high-temperature lithium-ion battery electrolyte can effectively eliminate residual trace water introduced in a battery production process and trace water generated in a subsequent high-temperature process, restrain HF generation, and protect an electrochemical system in the lithium-ion battery, thereby effectively improving high-temperature storage performance and high-temperature cycling performance of the lithium-ion battery.

Specifically, the high-temperature lithium-ion battery electrolyte provided in this embodiment of the present application includes a lithium salt, an organic solvent, and a water removal additive. The water removal additive is a phosphoric acid cyclic anhydride compound with a structural formula shown as a formula (1):

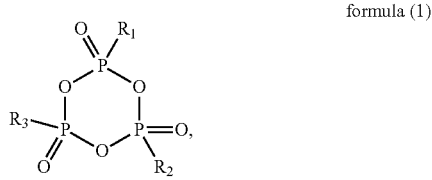

formula (1)

where $R_1$ is a —NCH—$(CH_2)_n$—CN group, 0<n≤20, and n is an integer;

$R_2$ is a —$R_{11}$—CO—$NR_{12}R_{13}$ group, $R_{11}$ is a —$(CH_2)_m$— group, 0≤m<19, each of $R_{12}$ and $R_{13}$ is one independently selected from H and —$(CH_2)_x$—$CH_3$ groups, 0≤x≤19-m, and both m and x are integers; and $R_3$ is any one selected from H, F, Cl, and Br.

According to the high-temperature lithium-ion battery electrolyte provided in this embodiment of the present application, the phosphoric acid cyclic anhydride compound with the foregoing specific structure is added as the water removal additive. The phosphoric acid cyclic anhydride compound may perform a complexation reaction with water, thereby effectively eliminating the residual trace water introduced in the battery production process and the trace water generated in the subsequent high-temperature process, restraining the HF generation, effectively avoiding a series of chain side reactions caused by HF, while protecting the electrochemical system in the lithium-ion battery, and significantly improving the high-temperature performance of the lithium-ion battery.

In an implementation of the present application, a value range of n may be 1-10, 1-6, 2-5, or 4-7, and a value range of m may be 1-12, 1-8, 2-6, or 3-5.

In some implementations of the present application, $R_1$ is a —NCH—$(CH_2)_2$—CN group, $R_2$ is a —$CH_2$—CO—$NHCH_3$ group, and $R_3$ is F. For example, a molecular formula of the water removal additive can be $(P_3O_6)$$(C_4H_5N_2)(C_3H_6ON)F$, which is recorded as SPFACA.

In other implementations of the present application, $R_1$ is a —NCH—$(CH_2)_4$—CN group, $R_2$ is a —$CH_2$—CO—$NHCH_3$ group, and $R_3$ is F. For example, a molecular formula of the water removal additive can be $(P_3O_6)$$(C_6H_9N_2)(C_3H_6ON)F$.

In other implementations of the present application, $R_1$ is a —NCH—$(CH_2)_3$—CN group, $R_2$ is a —$(CH_2)_2$—CO—$NHCH_3$ group, and $R_3$ is Cl. For example, a molecular formula of the water removal additive can be $(P_3O_6)$$(C_5H_7N_2)(C_4H_8ON)Cl$.

In other implementations of the present application, $R_1$ is a —NCH—$(CH_2)_3$—CN group, $R_2$ is a —$(CH_2)_2$—CO—$NHCH_3$ group, and $R_3$ is F. For example, a molecular formula of the water removal additive can be $(P_3O_6)$$(C_5H_7N_2)(C_4H_8ON)F$.

In other implementations of the present application, $R_1$ is a —NCH—$(CH_2)_2$—CN group, $R_2$ is a —$(CH_2)_2$—CO—$NHCH_2CH_3$ group, and $R_3$ is Cl. For example, a molecular formula of the water removal additive can be $(P_3O_6)$$(C_4H_5N_2)(C_5H_{10}ON)Cl$.

In other implementations of the present application, $R_1$ is a —NCH—$(CH_2)_2$—CN group, $R_2$ is a —$CH_2$—CO—$NHCH_3$ group, and $R_3$ is H. For example, a molecular formula of the water removal additive can be $(P_3O_6)$$(C_4H_5N_2)(C_4H_8ON)H$.

In some implementations of the present application, the water removal additive can account for 0.5%-5% or 0.5%-2% of a total weight of the high-temperature lithium-ion battery electrolyte. An appropriate additive amount may effectively improve high-temperature performance of a battery without affecting low-temperature discharge performance of the battery.

In a preferred implementation of the present application, the electrolyte further includes a positive electrode film-forming additive and/or a negative electrode film-forming additive, the positive electrode film-forming additive is selected from at least one of adiponitrile (ADN, molecular formula: $C_6H_8N_2$), lithium difluoro oxalate borate (LiDFOB, molecular formula: $C_2BF_2LiO_4$), or ethylene carbonate (VEC), and the negative electrode film-forming additive is selected from at least one of lithium difluoro oxalate borate (LiDFOB, molecular formula: $C_2BF_2LiO_4$), vinylene carbonate (VC), ethylene carbonate (VEC), or 1,3-(1-propenyl) sultone (PS). In this preferred implementation, the positive electrode film-forming additive accounts for 1%-3% of the total weight of the high-temperature lithium-ion battery electrolyte, and the negative electrode film-forming additive accounts for 0.5%-4% of the total weight of the high-temperature lithium-ion battery electrolyte.

According to the high-temperature lithium-ion battery electrolyte provided in the aforementioned preferred embodiment of the present application, after the water removal additive is added, the positive electrode film-forming additive and/or the negative electrode film-forming additive of a certain amount is further added. This may not only effectively eliminate trace water in a battery system to restrain HF generation, but also form a high-temperature and stable SEI protective film on surfaces of the positive electrode and the negative electrode to isolate a positive electrode material and a negative electrode material from being in direct contact with the electrolyte, thereby obtaining more excellent high-temperature storage performance and high-temperature cycling performance.

In some implementations of the present application, the organic solvent is selected from at least one of propylene carbonate (PC), ethylene carbonate (EC), dimethyl carbonate (DMC), ethyl methyl carbonate (EMC), or diethyl carbonate (DEC). The organic solvent can account for 70%-93% of the total weight of the high-temperature lithium-ion battery electrolyte.

In some implementations of the present application, the lithium salt is selected from at least one of lithium hexafluorophosphate (LiPF$_6$), lithium difluoro oxalate borate (LiDFOB), or lithium bisfluorosulfonyl imide (LiFSI). The lithium salt can account for 5%-18% of the total weight of the high-temperature lithium-ion battery electrolyte.

Correspondingly, an embodiment of the present application further provides a production method for the foregoing high-temperature lithium-ion battery electrolyte, including the following steps:

in a closed environment with moisture ≤10 ppm, refining and purifying an organic solvent, adding a lithium salt and a water removal additive to the organic solvent, and mixing the lithium salt and the water removal additive with the organic solvent uniformly, to obtain a high-temperature lithium-ion battery electrolyte, where the water removal additive is a phosphoric acid cyclic anhydride compound with a structural formula shown as a formula (1):

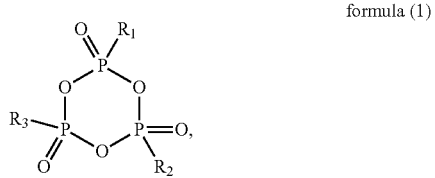

formula (1)

where $R_1$ is a —NCH—(CH$_2$)$_n$—CN group, 0<n≤20, and n is an integer;

$R_2$ is a —R$_{11}$—CO—NR$_{12}$R$_{13}$ group, R$_{11}$ is a —(CH$_2$)$_m$— group, 0≤m<19, each of R$_{12}$ and R$_{13}$ is one independently selected from H and —(CH$_2$)$_x$—CH$_3$ groups, 0≤x≤19-m, and both m and x are integers; and $R_3$ is any one selected from H, F, Cl, and Br.

In this implementation of the present application, a value range of n may be 1-10, 1-6, 2-5, or 4-7, and a value range of m may be 1-12, 1-8, 2-6, or 3-5.

In some implementations of the present application, a molecular formula of the water removal additive is (P$_3$O$_6$)(C$_4$H$_5$N$_2$)(C$_3$H$_6$ON)F. That is, in the formula (1), R$_1$ is a —NCH—(CH$_2$)$_2$—CN group, R$_2$ is a —CH$_2$—CO—NHCH$_3$ group, and R$_3$ is F.

In other implementations of the present application, a molecular formula of the water removal additive is (P$_3$O$_6$)(C$_6$H$_9$N$_2$)(C$_3$H$_6$ON)F. That is, in the formula (1), R$_1$ is a —NCH—(CH$_2$)$_4$—CN group, R$_2$ is a —CH$_2$—CO—NHCH$_3$ group, and R$_3$ is F.

In other implementations of the present application, a molecular formula of the water removal additive is (P$_3$O$_6$)(C$_5$H$_7$N$_2$)(C$_4$H$_8$ON) Cl. That is, in the formula (1), R$_1$ is a —NCH—(CH$_2$)$_3$—CN group, R$_2$ is a —(CH$_2$)$_2$—CO—NHCH$_3$ group, and R$_3$ is Cl.

In other implementations of the present application, a molecular formula of the water removal additive is (P$_3$O$_6$)(C$_5$H$_7$N$_2$)(C$_4$H$_8$ON)F. That is, in the formula (1), R$_1$ is a —NCH—(CH$_2$)$_3$—CN group, R$_2$ is a —(CH$_2$)$_2$—CO—NHCH$_3$ group, and R$_3$ is F.

In other implementations of the present application, a molecular formula of the water removal additive is (P$_3$O$_6$)(C$_4$H$_5$N$_2$)(C$_5$H$_{10}$ON) Cl. That is, in the formula (1), R$_1$ is a —NCH—(CH$_2$)$_2$—CN group, R$_2$ is a —(CH$_2$)$_2$—CO—NHCH$_2$CH$_3$ group, and R$_3$ is Cl.

In other implementations of the present application, a molecular formula of the water removal additive is (P$_3$O$_6$)(C$_4$H$_5$N$_2$)(C$_4$H$_8$ON)H. That is, in the formula (1), R$_1$ is a —NCH—(CH$_2$)$_2$—CN group, R$_2$ is a —CH$_2$—CO—NHCH$_3$ group, and R$_3$ is H.

In this implementation of the present application, the water removal additive can account for 0.5%-5% of a total weight of the high-temperature lithium-ion battery electrolyte.

In some implementations of the present application, the production method further includes adding a positive electrode film-forming additive and/or a negative electrode film-forming additive to the organic solvent, the positive electrode film-forming additive is selected from at least one of adiponitrile, lithium difluoro oxalate borate, or ethylene carbonate, and the negative electrode film-forming additive is selected from at least one of lithium difluoro oxalate borate, vinylene carbonate, ethylene carbonate, or 1,3-(1-propenyl) sultone.

In this implementation of the present application, the positive electrode film-forming additive can account for 1%-3% of the total weight of the high-temperature lithium-ion battery electrolyte, and the negative electrode film-forming additive can account for 0.5%-4% of the total weight of the high-temperature lithium-ion battery electrolyte.

In some implementations of the present application, the organic solvent is selected from at least one of propylene carbonate (PC), ethylene carbonate (EC), dimethyl carbonate (DMC), ethyl methyl carbonate (EMC), or diethyl carbonate (DEC). When there are two or more organic solvents, the organic solvents are separately refined and purified, and then mixed according to a certain ratio.

In this implementation of the present application, the lithium salt can be selected from at least one of lithium hexafluorophosphate (LiPF$_6$), lithium difluoro oxalate borate (LiDFOB), or lithium bisfluorosulfonyl imide (LiFSI).

In some implementations of the present application, components may be stirred for uniform mixing, and a stirring time may be 30 minutes.

The foregoing production method provided in this embodiment of the present application is simple and feasible, and is suitable for magnified production.

In addition, an embodiment of the present application further provides a high-temperature lithium-ion battery, including a positive electrode, a negative electrode, a separator, and an electrolyte, where the foregoing high-temperature lithium-ion battery electrolyte provided in the foregoing embodiment of the present application is used as the electrolyte.

In some implementations of the present application, the positive electrode includes a positive electrode active material that can be embedded into or removed from a lithium ion, and the positive electrode active material is at least one of LiCoO$_2$, LiNiO$_2$, LiMn$_2$O$_4$, LiNi$_{0.5}$Mn$_{1.5}$O$_4$, LiFeO$_4$, or Li(Co$_x$Ni$_y$Mn$_{1-x-y}$)O$_2$ (0<x+y<1); the negative electrode includes a negative electrode active material that can be embedded into or removed from a lithium ion, and the negative electrode active material is at least one of graphite, hard carbon, soft carbon, lithium titanate, or a silicon alloy; and the separator is at least one of PP, PE, PP/PE/PP, or a ceramic isolation film.

The high-temperature lithium-ion battery provided in this embodiment of the present application has good high-temperature storage performance and high-temperature cycling performance. The high-temperature lithium-ion battery may be applied to high-tech fields such as a notebook computer, a mobile phone, a mobile tool, an electric vehicle, backup power for a base station, and drilling.

The following uses production and testing of a cylindrical battery (model: 18650; nominal capacity: 2500 mAh) as an example and uses a plurality of embodiments to further describe the embodiments of the present application. The embodiments of the present application are not limited to the following specific embodiments. A proper change may be made to an implementation without changing the scope of main claims.

Embodiment 1

A production method for a high-temperature lithium-ion battery electrolyte includes the following steps:

in a closed environment with moisture content ≤10 ppm, refining and purifying carbonate organic solvents, mixing the carbonate organic solvents uniformly according to a certain proportion EC:EMC:DMC=2:3:5 (V %), then adding VC (1%), PS (3%), LiDFOB (1%), SPFACA (2%), and ADN (2%) additives according to a weight percentage, finally dissolving $LiPF_6$ in the organic solvents according to 1.15 mol/L, and stirring the mixture uniformly, to obtain a high-temperature lithium-ion battery electrolyte required in this embodiment.

A high-temperature lithium-ion battery is produced as follows:

A positive electrode plate is produced as follows: uniformly mixing lithium nickel cobalt manganese ($LiNi_{0.5}Co_{0.2}Mn_{0.3}O_2$), conductive carbon powder (SP), and polyvinylidene fluoride (PVDF) according to a weight percentage 97:1.5:1.5, adding N-methylpyrrolidone (NMP) to the mixture, and stirring the mixture uniformly to obtain a positive electrode slurry with certain fluidity; then, coating 12 μm thick aluminum foil with the positive electrode slurry, with a coating weight being 0.0244 $g/cm^2$, and drying the foil to form a positive electrode plate with certain flexibility; and finally, implementing processes such as cold pressing, slitting, and welding to make a to-be-wound positive electrode plate.

A negative electrode is produced as follows: mixing graphite, conductive carbon powder (SP), and polyvinylidene fluoride (PVDF) according to a weight percentage 97.5:1.0:1.5 uniformly, adding NMP to the mixture, and stirring the mixture uniformly to obtain a negative electrode slurry with certain fluidity; then, coating 9 μm thick aluminum foil with the negative electrode slurry, with a coating weight being 0.0182 $g/cm^2$, and drying the foil to form a negative electrode plate with certain flexibility; and finally, implementing processes such as cold pressing, slitting, and welding to make a to-be-wound negative electrode plate.

A battery is assembled as follows: on the foregoing produced to-be-wound positive electrode plate, the foregoing produced to-be-wound negative electrode plate, and a ceramic isolation film (total thickness of 16 μm, with a ceramic layer being 4 μm thick) together, performing operations such as winding, shell filling, welding, roll grooving, drying, injecting into the foregoing produced high-temperature lithium-ion battery electrolyte in this embodiment, top sealing, formatting, and capacity grading to produce a cylindrical high-temperature lithium-ion battery.

Embodiment 2

A production method for a high-temperature lithium-ion battery electrolyte includes the following steps:

in a closed environment with moisture content <10 ppm, refining and purifying carbonate organic solvents, mixing the carbonate organic solvents uniformly according to a certain proportion EC:EMC:DMC:PC=3:3:3:1 (V %), then adding VC (1%), SPFACA (1.8%), LiFSI (1%), and ADN (3%) additives according to a weight percentage, finally dissolving $LiPF_6$ in the organic solvents according to 1.0 mol/L, and mixing the mixture uniformly, to finally obtain a high-temperature lithium-ion battery electrolyte required in this embodiment.

A production method for a high-temperature lithium-ion battery is the same as the production method in Embodiment 1.

Embodiment 3

A production method for a high-temperature lithium-ion battery electrolyte includes the following steps:

in a closed environment with moisture content <10 ppm, refining and purifying carbonate solvents, mixing the carbonate solvents uniformly according to a certain proportion EC:EMC:DMC=1:1:1 (V %), then adding VC (0.5%) and SPFACA (1.5%) additives according to a weight percentage, finally dissolving $LiPF_6$ in the solvents according to 1.0 mol/L and LiDFOB in the solvents according to 0.1 mol/L, and mixing the mixture uniformly, to finally obtain a high-temperature lithium-ion battery electrolyte required in this embodiment.

A production method for a high-temperature lithium-ion battery is the same as the production method in Embodiment 1.

Embodiment 4

A production method for a high-temperature lithium-ion battery electrolyte includes the following steps:

in a closed environment with moisture content <10 ppm, refining and purifying carbonate organic solvents, mixing the carbonate organic solvents uniformly according to a certain proportion EC:EMC:DMC:DEC:PC=2:2:4:1:1 (V %), then adding VC (1.5%), SPFACA (1.2%), and ADN (3%) additives according to a weight percentage, finally dissolving $LiPF_6$ in the organic solvents according to 0.8 mol/L and LiFSI in the organic solvents according to 0.2 mol/L, and mixing the mixture uniformly, to finally obtain a high-temperature lithium-ion battery electrolyte required in this embodiment of the present application.

A production method for a high-temperature lithium-ion battery is the same as the production method in Embodiment 1.

Embodiment 5

A production method for a high-temperature lithium-ion battery electrolyte includes the following steps:

in a closed environment with moisture content ≤10 ppm, refining and purifying carbonate solvents, mixing the carbonate solvents uniformly according to a certain proportion EC:EMC:DMC=2:2:4 (V %), then adding LiDFOB (1%), SPFACA (1%), and ADN (2%) additives according to a weight percentage, finally dissolving $LiPF_6$ in the solvents according to 0.8 mol/L and LiFSI in the solvents according to 0.2 mol/L, and mixing the mixture uniformly, to finally obtain a high-temperature lithium-ion battery electrolyte required in this embodiment of the present application.

A production method for a high-temperature lithium-ion battery is the same as the production method in Embodiment 1.

Embodiment 6

A production method for a high-temperature lithium-ion battery electrolyte includes the following steps:

in a closed environment with moisture content ≤10 ppm, refining and purifying carbonate solvents, mixing the carbonate solvents uniformly according to a certain proportion EC:EMC:DMC:PC=2:2:4:1 (V %), then adding PS (2%), SPFACA (0.8%), and LiDFOB (1%) additives according to a weight percentage, finally dissolving $LiPF_6$ in the organic solvents according to 0.8 mol/L, and mixing the mixture uniformly, to finally obtain a high-temperature lithium-ion battery electrolyte required in this embodiment of the present application.

A production method for a high-temperature lithium-ion battery is the same as the production method in Embodiment 1.

Embodiment 7

A production method for a high-temperature lithium-ion battery electrolyte includes the following steps:

in a closed environment with moisture content ≤10 ppm, refining and purifying carbonate solvents, mixing the carbonate solvents uniformly according to a certain proportion EC:EMC:DMC:DEC=2:3:4:1 (V %), then adding PS (1%), SPFACA (0.6%), and LiDFOB (2%) additives according to a weight percentage, finally dissolving $LiPF_6$ in the organic solvents according to 0.6 mol/L, and mixing the mixture uniformly, to finally obtain a high-temperature lithium-ion battery electrolyte required in this embodiment of the present application.

A production method for a high-temperature lithium-ion battery is the same as the production method in Embodiment 1.

Embodiment 8

A production method for a high-temperature lithium-ion battery electrolyte includes the following steps:

in a closed environment with moisture content <10 ppm, refining and purifying carbonate solvents, mixing the carbonate solvents uniformly according to a certain proportion EC:EMC:DMC:DEC=2:3:4:1 (V %), then adding VEC (1%), SPFACA (0.8%), LiTFSI (1%), and LiBF4 (2%) additives according to a weight percentage, finally dissolving $LiPF_6$ in the organic solvents according to 0.6 mol/L, and mixing the mixture uniformly, to finally obtain a high-temperature lithium-ion battery electrolyte required in this embodiment of the present application.

A production method for a high-temperature lithium-ion battery is the same as the production method in Embodiment 1.

Embodiment 9

A production method for a high-temperature lithium-ion battery electrolyte includes the following steps:

in a closed environment with moisture content ≤10 ppm, refining and purifying carbonate organic solvents, mixing the carbonate organic solvents uniformly according to a certain proportion EC:EMC:DMC=2:3:5 (V %), then adding VC (1%), PS (3%), LiDFOB (1%), $(P_3O_6)(C_6H_9N_2)(C_3H_6ON)F$ (2%), and ADN (2%) additives according to a weight percentage, finally dissolving $LiPF_6$ in the organic solvents according to 1.15 mol/L, and stirring the mixture uniformly, to obtain a high-temperature lithium-ion battery electrolyte required in this embodiment.

Embodiment 10

A production method for a high-temperature lithium-ion battery electrolyte includes the following steps:

in a closed environment with moisture content ≤10 ppm, refining and purifying carbonate organic solvents, mixing the carbonate organic solvents uniformly according to a certain proportion EC:EMC:DMC=2:3:5 (V %), then adding VC (1%), PS (3%), LiDFOB (1%), $(P_3O_6)(C_5H_7N_2)(C_4H_8ON)$ Cl (2%), and ADN (2%) additives according to a weight percentage, finally dissolving $LiPF_6$ in the organic solvents according to 1.15 mol/L, and stirring the mixture uniformly, to obtain a high-temperature lithium-ion battery electrolyte required in this embodiment.

Comparative Example 1

An electrolyte is configured as follows: in a closed environment with moisture content ≤10 ppm, refining and purifying carbonate solvents, mixing the carbonate solvents uniformly according to a certain proportion EC:EMC:DMC=2:3:5 (V %), then adding VC (1%) and PS (3%) additives according to a weight percentage, finally dissolving $LiPF_6$ in the solvents according to 1.15 mol/L, and mixing the mixture uniformly, to finally obtain a lithium-ion battery electrolyte required in comparative example 1.

Production of a lithium-ion battery: A specific production method for producing a lithium-ion battery by using the electrolyte produced in comparative example 1 is the same as the production method in Embodiment 1.

Comparative Example 2

An electrolyte is configured as follows: in a closed environment with moisture content ≤10 ppm, refining and purifying carbonate solvents, mixing the carbonate solvents uniformly according to a certain proportion EC:EMC:DMC:PC=3:3:3:1 (V %), then adding VC (1%), PS (1%), LiFSI (1%), and ADN(3%) additives according to a weight percentage, finally dissolving $LiPF_6$ in the solvents according to 1.0 mol/L, and mixing the mixture uniformly, to finally obtain a lithium-ion battery electrolyte required in comparative example 2.

Production of a lithium-ion battery: A specific production method for producing a lithium-ion battery by using the electrolyte produced in comparative example 2 is the same as the production method in Embodiment 1.

EFFECT EMBODIMENT

In order to provide strong support for beneficial effects brought by the technical solutions of the embodiments of the present application, the following performance tests are specially provided:

A high-temperature storage test and a high-temperature cycle test are performed for the high-temperature lithium-ion batteries produced in Embodiment 1 to Embodiment 8 of the present application and the lithium-ion batteries produced in Comparative examples 1 and 2. Specific test operations are as follows:

(1) High-temperature storage test: Discharge, at room temperature (23° C.±3° C.), the high-temperature lithium-ion batteries produced in Embodiment 1 to Embodiment 8 and the lithium-ion batteries produced in Comparative examples 1 and 2 at 0.5 C to 3.0 V, then charge the lithium-ion batteries to 4.2 V with a charging current being 0.5 C, and repeat the foregoing steps for two weeks. Then, bake the fully charged lithium-ion batteries in a 60° C.±3° C. oven for a period of time (30 d, 60 d, or 90 d), take out the lithium-ion batteries, and wait until a temperature of the lithium-ion batteries is the same as a room temperature (23° C.±3° C.). Then, discharge the lithium-ion batteries at 0.5 C to 3.0 V, then charge the lithium-ion batteries to 4.2 V with the charging current being 0.5 C, and repeat the foregoing steps for two weeks. Calculate a recoverable capacity of a corresponding sample by using a proportion between reversible capacities after the sample is stored at a high temperature. A result is listed in Table 1.

TABLE 1

| Group | Detection indicator | | |
| --- | --- | --- | --- |
|  | 60° C. @ 30 d Capacity recovery rate | 60° C. @ 60 d Capacity recovery rate | 60° C. @ 90 d Capacity recovery rate |
| Embodiment 1 | 98.22% | 96.86% | 95.79% |
| Embodiment 2 | 97.63% | 96.37% | 95.48% |
| Embodiment 3 | 94.68% | 92.55% | 91.40% |
| Embodiment 4 | 97.52% | 95.24% | 93.10% |
| Embodiment 5 | 97.13% | 94.69% | 90.50% |
| Embodiment 6 | 95.38% | 93.17% | 87.30% |
| Embodiment 7 | 94.69% | 90.62% | 87.70% |
| Embodiment 8 | 95.39% | 92.52% | 88.68% |
| Comparative example 1 | 78.66% | 63.21% | 42.94% |
| Comparative example 2 | 82.28% | 66.82% | 49.25% |

Table 1 lists capacity recovery rate data obtained after the high-temperature lithium-ion batteries produced in Embodiment 1 to Embodiment 8 and the lithium-ion batteries produced in Comparative examples 1 and 2 undergo a charge and discharge test after being stored in a fully charged state at 60° C. for different quantities of days. It can be learned from Table 1 that when an electrolyte contains the water removal additive SPFACA, high-temperature storage performance of the lithium-ion batteries is greatly improved, and an improvement effect is better especially when a positive electrode additive and a negative electrode additive are used together with a water removal additive.

(2) High-temperature cycle test: Perform a cycle test under a condition of 60° C.±3° C. by discharging the high-temperature lithium-ion batteries produced in Embodiment 1 to Embodiment 8 and the lithium-ion batteries produced in Comparative examples 1 and 2 at 0.5 C to 3.0 V and charging them at 0.5 C to 4.2 V, for 100 weeks, 300 weeks, and 500 weeks separately. Capacity retention rate data is listed in Table 2.

TABLE 2

| Group | Detection indicator | | |
| --- | --- | --- | --- |
|  | 100-week capacity retention rate | 300-week capacity retention rate | 500-week capacity retention rate |
| Embodiment 1 | 97.12% | 93.68% | 91.20% |
| Embodiment 2 | 96.83% | 92.77% | 90.36% |
| Embodiment 3 | 95.68% | 91.15% | 89.86% |
| Embodiment 4 | 96.8% | 92.14% | 90.08% |
| Embodiment 5 | 95.19% | 90.79% | 89.50% |
| Embodiment 6 | 95.88% | 90.07% | 87.30% |
| Embodiment 7 | 94.69% | 91.32% | 87.70% |
| Embodiment 8 | 94.69% | 91.32% | 87.70% |
| Comparative example 1 | 88.32% | 52.15% | 11.32% |
| Comparative example 2 | 90.12% | 66.82% | 23.14% |

Table 2 lists data obtained after the high-temperature lithium-ion batteries produced in Embodiment 1 to Embodiment 8 and the lithium-ion batteries produced in Comparative examples 1 and 2 undergo a charge and discharge test at 60° C. It can be learned from Table 2 that when an electrolyte contains the water removal additive SPFACA, high-temperature storage performance of the lithium-ion batteries is greatly improved, and an improvement effect is better especially when a positive electrode additive and a negative electrode additive are used together with a water removal additive.

The foregoing test data may indicate that the high-temperature lithium-ion batteries provided in the present application have good high-temperature electrochemical performance. Capacity recovery rates of the high-temperature lithium-ion batteries may reach more than 87% after the high-temperature lithium-ion batteries undergo a charge and discharge test after being stored in a fully charged state at 60° C. for 90 days. Capacity retention rates of the high-temperature lithium-ion batteries may still reach more than 87% after the high-temperature lithium-ion batteries under a condition of 60° C.±3° C. are discharged at 0.5 C to 3.0 V and charged at 0.5 C to 4.2 V cyclically for 500 weeks. This is because in the electrolytes used by the high-temperature lithium-ion batteries in the embodiments of the present application, a water removal additive of a specific structure is added, and a positive electrode film-forming additive and/or a negative electrode film-forming additive of a certain amount are/is also added. This may not only effectively eliminate trace water in a battery system to restrain HF generation, but also form a high-temperature and stable SEI protective film on surfaces of a positive electrode and a negative electrode to isolate a positive electrode material and a negative electrode material from being in direct contact with the electrolyte, so as to reduce side reactions, thereby significantly improving the high-temperature storage performance and high-temperature cycling performance of the lithium-ion batteries.

It should be noted that according to a disclosure and a description in the foregoing specification, a person skilled in the art to which the present application belongs may further make alterations and modifications to the foregoing implementations. Therefore, the present application is not limited to the specific implementations disclosed and described above. Some equivalent modifications and alterations made to the present application should also fall within the protection scope of the claims of the present application. In addition, although some specific terms are used in this specification, these terms are used only for convenience of description and do not constitute any limitation on the present application.

What is claimed is:

1. A high-temperature lithium-ion battery electrolyte, comprising a lithium salt, an organic solvent, and a water removal additive wherein the water removal additive is a phosphoric acid cyclic anhydride compound of formula (1):

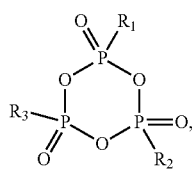

formula (1)

wherein

R$_1$ is a —NCH—(CH$_2$)$_n$—CN group, wherein 0<n≤20, and n is an integer;

R$_2$ is a —R$_{11}$—CO—NR$_{12}$R$_{13}$ group, wherein R$_{11}$ is a —(CH$_2$)$_m$— group with 0≤m<19, each of R$_{12}$ and R$_{13}$ is independently selected from H and a —(CH$_2$)$_x$—CH$_3$ group with 0≤x≤19-m, and both m and x are integers; and R$_3$ is selected from H, F, Cl, and Br.

2. The high-temperature lithium-ion battery electrolyte according to claim 1, wherein n is an integer from 1 to 10, and m is an integer from 1 to 12.

3. The high-temperature lithium-ion battery electrolyte according to claim 1, wherein n is an integer from 1 to 6, and m is an integer from 1 to 8.

4. The high-temperature lithium-ion battery electrolyte according to claim 1, wherein R$_1$ is a —NCH—(CH$_2$)$_2$—CN group, R$_2$ is a —CH$_2$—CO—NHCH$_3$ group, and R$_3$ is F.

5. The high-temperature lithium-ion battery electrolyte according to claim 1, wherein R$_1$ is a —NCH—(CH$_2$)$_4$—CN group, R$_2$ is a —CH$_2$—CO—NHCH$_3$ group, and R$_3$ is F.

6. The high-temperature lithium-ion battery electrolyte according to claim 1, wherein R$_1$ is a —NCH—(CH$_2$)$_3$—CN group, R$_2$ is a —(CH$_2$)$_2$—CO—NHCH$_3$ group, and R$_3$ is Cl.

7. The high-temperature lithium-ion battery electrolyte according to claim 1, wherein the water removal additive accounts for 0.5%-5% of a total weight of the high-temperature lithium-ion battery electrolyte.

8. The high-temperature lithium-ion battery electrolyte according to claim 1, wherein the electrolyte further comprises a positive electrode film-forming additive and/or a negative electrode film-forming additive.

9. The high-temperature lithium-ion battery electrolyte according to claim 8, wherein the electrolyte comprises a positive electrode film-forming additive and the positive electrode film-forming additive is selected from at least one of adiponitrile, lithium difluoro oxalate borate, and ethylene carbonate.

10. The high-temperature lithium-ion battery electrolyte according to claim 8, wherein the electrolyte comprises a negative electrode film-forming additive and the negative electrode film-forming additive is selected from at least one of lithium difluoro oxalate borate, vinylene carbonate, ethylene carbonate, and 1,3-(1-propenyl) sultone.

11. The high-temperature lithium-ion battery electrolyte according to claim 8, wherein the positive electrode film-forming additive accounts for 1%-3% of the total weight of the high-temperature lithium-ion battery electrolyte, and/or the negative electrode film-forming additive accounts for 0.5%-4% of the total weight of the high-temperature lithium-ion battery electrolyte.

12. The high-temperature lithium-ion battery electrolyte according to claim 1, wherein the organic solvent is selected from at least one of propylene carbonate, ethylene carbonate, dimethyl carbonate, ethyl methyl carbonate, and diethyl carbonate.

13. The high-temperature lithium-ion battery electrolyte according to claim 1, wherein the lithium salt is selected from at least one of lithium hexafluorophosphate, lithium difluoro oxalate borate, and lithium bisfluorosulfonyl imide.

14. A production method for a high-temperature lithium-ion battery electrolyte, comprising the following steps:

in a closed environment with moisture ≤10 ppm, refining and purifying an organic solvent, adding a lithium salt and a water removal additive to the organic solvent, and mixing the lithium salt and the water removal additive with the organic solvent uniformly, to obtain a high-temperature lithium-ion battery electrolyte, wherein the water removal additive is a phosphoric acid cyclic anhydride compound of formula (1):

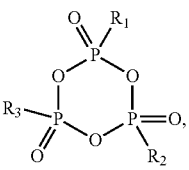

formula (1)

wherein

R$_1$ is a —NCH—(CH$_2$)$_n$—CN group, wherein 0<n≤20, and n is an integer;

R$_2$ is a —R$_{11}$—CO—NR$_{12}$R$_{13}$ group, wherein R$_{11}$ is a —(CH$_2$)$_m$— group with 0≤m<19, each of R$_{12}$ and R$_{13}$ is independently selected from H and a —(CH$_2$)$_x$—CH$_3$ group with 0≤x≤19-m, and both m and x are integers; and R$_3$ is selected from H, F, Cl, and Br.

15. The production method according to claim 14, wherein n is an integer from 1 to 10, and m is an integer from 1 to 12.

16. The production method according to claim 14, wherein the water removal additive accounts for 0.5%-5% of a total weight of the high-temperature lithium-ion battery electrolyte.

17. The production method according to claim 14, wherein the production method further comprises adding a positive electrode film-forming additive and/or a negative electrode film-forming additive to the organic solvent, the positive electrode film-forming additive is selected from at least one of adiponitrile, lithium difluoro oxalate borate, and ethylene carbonate, and the negative electrode film-forming additive is selected from at least one of lithium difluoro oxalate borate, vinylene carbonate, ethylene carbonate, and 1,3-(1-propenyl) sultone.

18. A high-temperature lithium-ion battery, comprising a positive electrode, a negative electrode, a separator, and the electrolyte according to claim 1.

19. A high-temperature lithium-ion battery, comprising a positive electrode, a negative electrode, a separator, and the electrolyte according to claim 12.

20. A high-temperature lithium-ion battery, comprising a positive electrode, a negative electrode, a separator, and the electrolyte according to claim 13.

* * * * *

UNITED STATES PATENT AND TRADEMARK OFFICE
CERTIFICATE OF CORRECTION

Page 1 of 1

PATENT NO. : 10,862,167 B2
APPLICATION NO. : 16/171983
DATED : December 8, 2020
INVENTOR(S) : Xu et al.

It is certified that error appears in the above-identified patent and that said Letters Patent is hereby corrected as shown below:

On the Title Page

Page 2: Item (56) Other Publications, Citation No. 3:
"performance of graphite/ LiNi0.5CO0.2Mn0.302 battery","
Should read:
-- performance of graphite/ LiNi0.5CO0.2Mn0.3O2 battery", --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*